United States Patent [19]

Maercklein

[11] 3,762,430
[45] Oct. 2, 1973

[54] DIFFERENTIAL PRESSURE REGULATOR
[75] Inventor: Charles D. Maercklein, Milwaukee, Wis.
[73] Assignee: Isotopes, Inc., Westwood, N.J.
[22] Filed: Apr. 30, 1971
[21] Appl. No.: 139,162

[52] U.S. Cl. ................................. 137/98, 251/61.3
[51] Int. Cl. ................... G05d 11/02, F16k 31/45
[58] Field of Search.................... 251/61.3, 61, 61.2, 251/367, 61.4; 137/505.13, 505.39, 509, 312, 505.42, 510, 494, 98

[56] References Cited
UNITED STATES PATENTS

| | | | |
|---|---|---|---|
| 1,619,948 | 3/1927 | Mangiameli | 137/98 |
| 3,432,152 | 3/1969 | Sweeney | 251/61.4 X |
| 1,539,630 | 5/1925 | Beaird | 251/61.3 X |
| 2,941,546 | 6/1960 | Cowherd | 251/367 X |
| 3,446,241 | 5/1969 | Skoli | 251/61.4 X |
| 3,463,442 | 8/1969 | Leskiewicz et al. | 251/61.2 |
| 2,329,323 | 9/1943 | Benz | 137/505.13 X |

*Primary Examiner*—Arnold Rosenthal
*Attorney*—Fleit, Gipple and Jacobson

[57] ABSTRACT

An improved differential pressure regulator having two continuous, hole-free diaphragms provided with a solid plug which is located between the diaphragms and is capable of moving with the movement of the diaphragms.

9 Claims, 6 Drawing Figures

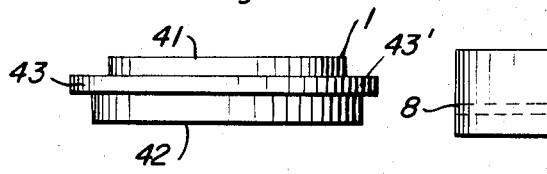
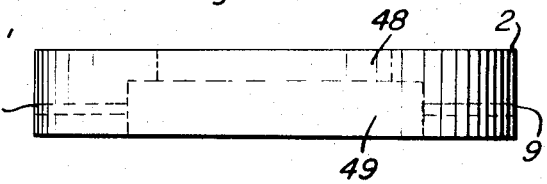
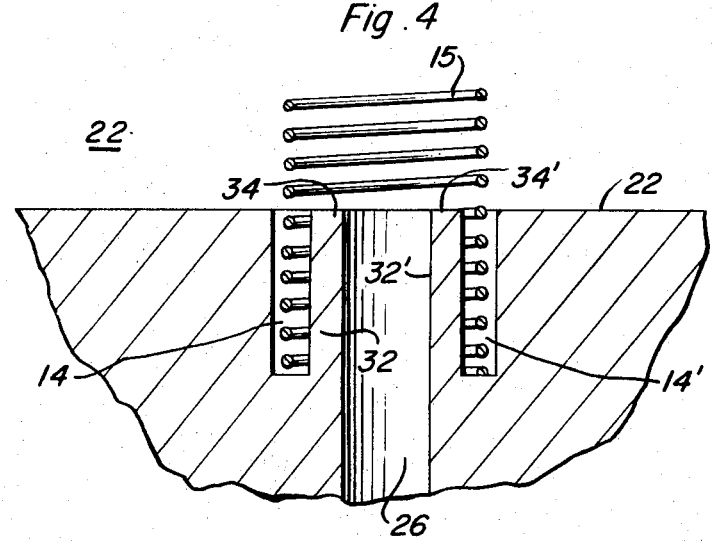
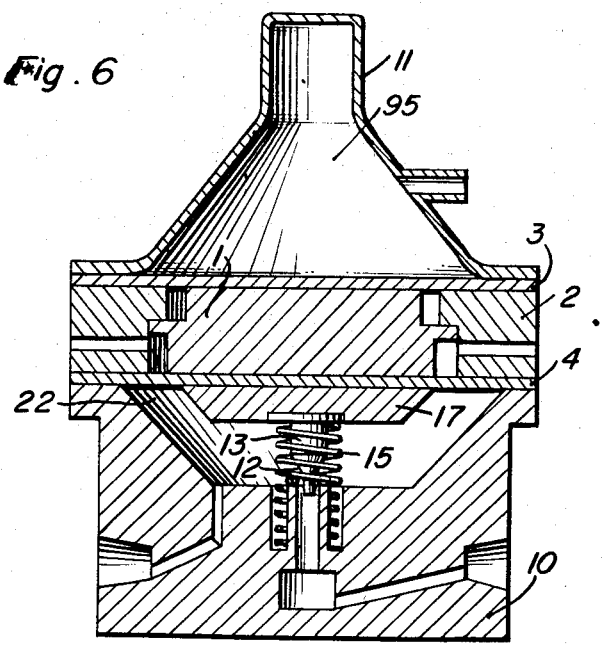

DIFFERENTIAL PRESSURE REGULATOR

BACKGROUND OF THE INVENTION

This invention relates to differential pressure regulators and a specific improvement therein.

Differential pressure regulators are well known devices and are used to control the pressure of one gas stream, or the "contolled gas" stream by reference to the pressure of a second gas or the "reference gas" stream.

A typical differential pressure regulator is composed of a number of adjoining chambers, the chambers being separated by a movable diaphragm. One of the chambers is connected to the reference gas line so the pressure in that chamber is the same as the pressure in the reference gas stream.

A second gas chamber adjoins the first gas chamber so that the diaphragm defining one side of the first gas chamber also defines a side of the second gas chamber. The regulator is constructed so that the gas to be controlled enters the second chamber through an inlet opening and leaves the chamber through an exit opening. Also, a valve which controls the flow of gas through the second chamber is attached in some way to the diaphragm so that it opens and closes in response to the movement of the diaphragm.

A valve generally used in the typical differential pressure regulator is a needle valve which comprises a conical member positioned so that it can move into and out of contact with an orifice thereby controlling the flow of gas through the orifice.

In operation, the position of the valve is determined by the relative forces provided by the pressure of the reference gas on one side of the diaphragm and the pressure of the control gas on the other side of the diaphragm. The valve which is connected to the diaphragm is so arranged that a change in pressure in the reference gas causes the diaphragm to move one way or the other. This in turn activates the valve to open or close thereby decreasing or increasing the flowrate of the controlled gas out of the second chamber. This causes a corresponding change in the pressure of the second chamber so that the pressure in the second chamber increases if the pressure in the first chamber increases and vice versa. This change in pressure brings the diaphragm back to its original position and thus the system comes back to equilibrium.

Such a device can be made so that a low pressure gas can control a high pressure gas. This is done by inserting a spring in the first chamber biasing the diaphragm to cause the valve in the second chamber to remain open. Thus, in order for the diaphragm to be in equilibrium, the force exerted by the high pressure gas in the second chamber must overcome not only the force produced by the pressure of the low pressure gas in the first chamber but also the force of the biasing spring.

In another modification of this basic regulator, two diaphragms are provided, and a space is maintained between them. This modification is used in situations where the reference gas and the controlled gas form potentially explosive mixtures. The space between the diaphragms is usually vented to the atmosphere, so that if some gas from one chamber leaks into the space between diaphragms, it is vented to the atmosphere. In this modification, the two diaphragms are connected by a solid link which usually extends through the center of each diaphragm and is connected to the diaphragm by a system of washers spaced on each side of each diaphragm. This is done to maintain a constant distance between the two diaphragms, so that movement of one diaphragm will be communicated to the other diaphragm.

These differential pressure regulators suffer from certain drawbacks which render them unsuitable for certain applications. In particular, the differential pressure regulators of the prior art have not been found to work entirely successfully when used in commercially feasible water electrolysis processes. In such processes two electrodes are usually placed in a container of an electrolyte and an asbestos sheet, separated from each electrode by a nickel screen, is provided for the site of the electrolysis reaction. When an electric current is supplied to the electrodes, hydrogen is given off on one side of the asbestos sheet and oxygen is given off on the other side of the asbestos sheet. In this process, it is essential to keep the pressure of the oxygen product stream a given amount, for example, 10 psi, below the pressure of the hydrogen product stream. Moreover, it is essential to keep this pressure differential relatively constant, for example, within plus or minus four psi regardless of the pressure of the system. In particular, it is necessary to keep this pressure differential relatively constant beginning with the initial start-up of the process, when both the hydrogen and the oxygen pressures are zero. The differential pressure regulators known in the prior art are incapable of providing this result in a safe and efficient manner.

A single diaphragm differential pressure regulator is unsatisfactory, because the potentially reactive hydrogen and oxygen are not sufficiently segregated from each other. Because the diaphragm in this regulator is usually connected to the control valve by a system of washers and links extending through the diaphragm, the hydrogen and oxygen can easily leak through the diaphragm. It has been found that a single diaphragm regulator can be used for only a relatively short time, such as a day or two, before either hydrogen or oxygen leaks into the other chamber and causes an explosion inside the regulator.

While a double diaphragm differential pressure regulator alleviates this problem somewhat, it still is not entirely satisfactory. Even though most of the gas that leaks through either of the diaphragms in this type regulator is vented to the atmosphere, some gas remains. This residual gas together with the gas which leaks from the other diaphragm is sufficient to cause internal explosions in this type of regulator after a few days' use.

In addition to the above, none of the differential pressure regulators of the prior art has been able to both effectively control the pressure of a low pressure gas stream by reference to a high pressure gas and at the same time provide a reasonably constant pressure differential from zero pressure up to the ultimate operating pressures.

The basic single diaphragm regulator cannot provide a pressure differential at all. Moreover, even when containing a biasing means such as a spring to provide a pressure differential, this type of regulator is only used to control a high pressure gas with a low pressure gas. The typical double diaphragm regulator also controls a high pressure gas with a low pressure gas.

A few attempts have been made to control a low pressure gas with a high pressure gas by employing a double diaphragm regulator having different size diaphragms, but these devices are incapable of providing a reasonable pressure differential at low pressures.

In addition, the dependability of the typical differential pressure regulator decreases with time, because the generally used needle valve develops significant leaks after a relatively short period of time.

It is an object of this invention to provide a differential pressure regulator which can be safely used with gases that form a potentially explosive mixture.

It is another object of this invention to provide a differential pressure regulator which can effectively control a low pressure gas stream by reference to a high pressure gas.

It is a still further object of this invention to provide a differential pressure regulator which can control a low pressure gas by means of a high pressure gas and at the same time provide a reasonably constant pressure differential from zero pressure to a reasonably high pressure.

It is a still further object of this invention to provide a differential pressure regulator in which the controlled gas line does not develop significant leaks after a short period of time.

Brief Summary of the Invention

These and other objects are accomplished according to this invention whereby a differential pressure regulator having two continuous diaphragms separated by a solid plug is provided. Moreover, in a particularly preferred embodiment of this invention, a means biasing the valve controlling the flow of the controlled gas through the regulator in an open position is also provided.

BRIEF DESCRIPTION OF THE DRAWINGS

The nature of this invention can be better understood by reference to the following drawings wherein

FIG. 2 is a side view of the plug used according to this invention.

FIG. 3 is a side view of the spacer used according to this invention.

FIG. 4 is an enlarged view of part of the improved differential pressure regulator shown in FIG. 1.

FIG. 6 is an axial section view of the improved differential pressure regulator of this invention when assembled.

DETAILED DESCRIPTION

Figure 1:
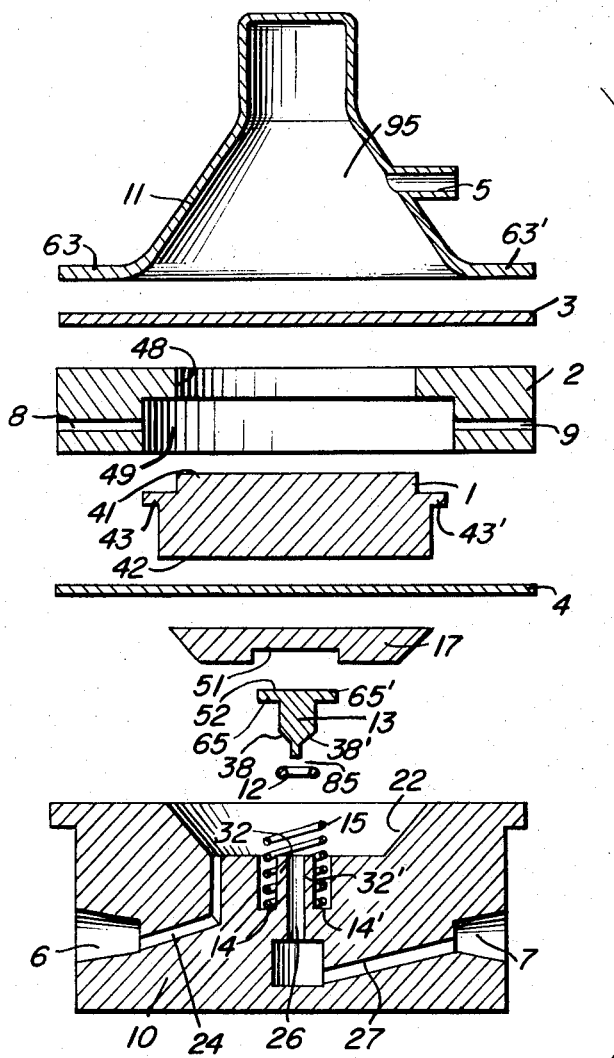
FIG. 1 is an exploded axial section view of the improved differential pressure regulator of this invention showing how the parts are assembled.

Referring specifically to FIG. 1, the improved differential pressure regulator of this invention is preferably circular in cross-section and comprises a bonnet 11 located in the upper portion of the regulator and a base 10 located in the lower portion of the regulator. The bonnet 11 is provided with an inlet 5 for the reference gas. The base 10 is provided with an inlet 6 which is in fluid communication with a cavity 22 by means of channel 24. Cavity 22 is also in fluid communication with exit port 7 by means of channels 26 and 27. A cylindrical seat 14, 14' is provided around channel 26 in order to receive a spring 15. The seat 14, 14' and the channel 26 define a cylindrical extension 32, 32' having end faces 34, 34'.

A valve generally indicated at 85, is composed as follows. An O-ring 12 having a radius substantially the same as the radius of extension 32, 32' is located above face 34, 34' of extension 32, 32'. Located directly above O-ring 12 and channel 26 in base 10 is a needle 13 having inclined surface 38, 38' and top portion 52 with flange 65, 65'. The O-ring 12 and needle 13 are located so that downward movement of the needle 13 will cause inclined surface 38, 38' to abut O-ring 12 which in turn abuts end face 34, 34' of extension 32, 32' to thereby close valve 85. This cuts off the flow of any gas flowing from cavity 22 to channel 26. The use of an O-ring and needle in this manner prevents any gas leaking from cavity 22 to chamber 26 when valve 85 is closed.

The closing of valve 85 is caused by means of the unique double diaphragm system of this invention. This system comprises diaphragms 3 and 4 and plug 1 and spacer 2, which are located between diaphragms 3 4. Plug 1 is a solid piece of material having end faces 41 and 42 and a flange 43, 43' extending radially outward from the center of the plug between faces 41 and 42.

Spacer 2 is a solid piece of material containing two cylindrical holes generally indicated at 48 and 49 concentric with spacer 2. The radius of hole 48 is slightly larger than the radius of end face 41 of plug 1, and the radius of hole 49 is slightly larger than the radius of flange 43, 43' of plug 1. This enables plug 1 to fit generally inside of spacer 2 with the portion of plug 1 extending above the top of flange 43, 43' and defined by face 41 fitting within hole 48 of spacer 2 and the portion of plug 1 extending below the top of flange 43, 43' fitting into hole 49 of spacer 2. Moreover, plug 1 is further constructed so that it is able to slidably move from this position away from inside spacer 2 towards base 10. In addition, spacer 2 is provided with vents 8 and 9 which allow hole 49 to communicate with the outside atmosphere. These vents are provided so that any gas which inadvertently passes through either of the diaphragms may be vented to the atmosphere. In particular, vents 8 and 9 are in fluid communication with the faces of diaphragms 3 and 4 abutting plug 1, regardless of the position of plug 1, because of construction tolerances necessary to allow plug 1 to slidably move in spacer 2.

Located between diaphragm 4 and needle 13 is washer 17. This washer is provided with recess 51 which is capable of engaging the top portion 52 of needle 13 allowing washer 17 to center needle 13 for engagement with O-ring 12 and face 34, 34' of extension 32, 32' of base 10. Moreover, washer 17 allows the contact between needle 13 and diaphragm 4 to be as large as possible, thereby minimizing the dangers of puncturing or otherwise destroying diaphragm 4 through excess wear of the diaphragm in a very localized area.

Figure 5:
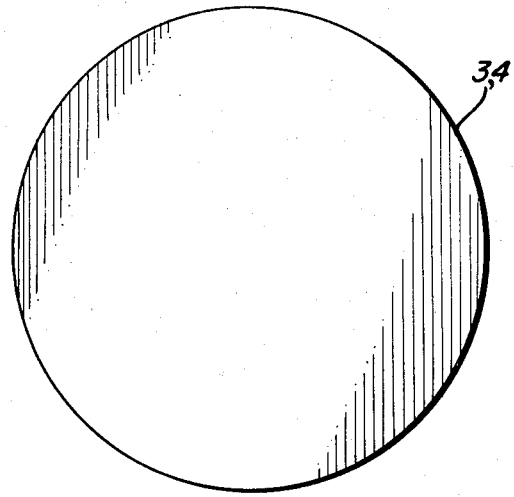
FIG. 5 is a top view of a diaphragm used in the improved differential pressure regulator of this invention.

As can be seen from FIG. 5, the diaphragms used according to this invention are continuous sheets or films of material and contain no holes on their active surfaces, that is the surfaces of the diaphragms effected by the gas pressure, to receive connecting shafts or cylinders. Moreover, in the operation of the improved differential pressure regulator of this invention, the diaphragms are free to travel in response to pressure variations and are not connected in their active services to anything. Remarkably, this specific designed feature prevents the leakage of both the reference gas and the controlled gas into the space between the double diaphragms, which enables the improved differential pressure regulator of this invention to be safely used with potentially explosive combinations of gases.

In addition, the use of vents 8 and 9 provides an additional safety factor in that if one of the diaphragms becomes damaged and allows gas to leak between the double diaphragms, an explosion is prevented because this gas will be vented to the atmosphere.

The diaphragms of this invention can be made from any material flexible enough to repeatedly move in operation and yet stable against the corrosive gases and contaminant liquids present in the gas streams. In addition, each diaphragm may be constructed of more than one layer of material in order to provide a diaphragm with properties not obtainable from a single layer diaphragm. For example, a diaphragm which has been found to be particularly useful is one made from a layer of Teflon next to a layer of rubber. The exact materials used to make the diaphragms of this invention are all well known in the art, and the selection of these materials forms no part of this invention.

When the parts of the improved differential pressure regulator of this invention are assembled together, O-ring 12 rests against face 34, 34' of extension 32, 32' of base 10. Spring 15 abuts against the lower face of flange 65, 65' of needle 13 and thus biases needle 13 away from channel 26. Washer 17 abuts against needle 13 so that top portion 52 of needle 13 is located in recess 51 of washer 17. Washer 17 rests against the low surface of diaphragm 4, and through the force provided by spring 15, pushes plug 1 inside spacer 2 so that the lower face of spacer 2 is generally flush with face 42 of plug 1 and the upper face of spacer 2 is generally flush with face 41 of plug 1. Diaphragm 3 rests against the relatively flat surface formed by the upper face of spacer 2 and face 41 of plug 1. The bonnet 11 then rests against the outside top surface of diaphragm 3.

The various parts of the improved differential pressure regulator of this invention are held together by conventional means. The nature of this means is not critical, and its design is evident to one of ordinary skill in the art. For example, the parts can be held together by a series of bolts extending from flange 63, 63' of bonnet 11 through diaphragm 3, spacer 2, diaphragm 4 and base 10 when they are secured with a series of nuts. Alternatively, C-clamps extending from flange 63, 63' of bonnet 11 to the bottom of base 10 can be provided to compress the parts together.

The various parts of the improved differential pressure regulator of this invention, aside from the diaphragms, can be made from any materials which do not corrode when in contact with the gases used or the contaminant liquids in the gases. For example, it has been found that stainless steel works very well in a great variety of applications. The proper selection of materials can be easily accomplished by the skilled artisan and forms no part of this invention.

In the operation of the improved differential pressure regulator of this invention, a line containing the reference gas is connected to inlet 5 of bonnet 11. A line containing the gas to be regulated, the controlled gas, is connected to inlet 6 of base 10 so that the controlled gas can flow through base 10 out exit port 7. The static pressure of the reference gas in cavity 95 formed by bonnet 11 and diaphragm 3 causes a force to be exerted by diaphragm 3 against face 41 of plug 1. This force, of course, depends on the surface area of face 41 and the pressure in cavity 95. When the plug 1 is in equilibrium and needle 13 is located, for example, in the middle of its path of travel, this force is exactly balanced by an opposing force comprising the force of spring 15 and the force due to the pressure of the controlled gas in cavity 22 of base 10 against diaphragm 4. If the reference gas pressure increases, plug 1 is forced downward, which in turn forces needle 13 closer to O-ring 12 and end face 34, 34' of extension 32, 32'. Since this narrows the opening in valve 85, the flow-rate of gas through base 10 is reduced, thereby increasing the upstream pressure of that gas. Thus, as can be seen an increase in the pressure of the reference gas causes a corresponding increase in the pressure of the controlled gas.

Alternatively, if the pressure of the reference gas decreases the force exerted against plug 1 by diaphragm 3 decreases allowing the force provided by spring 15 and the pressure of the controlled gas in cavity 22 of base 10 against diaphragm 4 to push plug 1 further into spacer 2. This in turn increases the distance between needle 13 and face 34, 34' of extension 32, 32', which increases the flow-rate of the controlled gas through base 10, thereby lowering the upstream pressure of the controlled gas.

Also, the improved differential pressure regulator of this invention is capable of automatically maintaining the desired pressure differential regardless of upstream changes in the flow-rate of the controlled gas. This is so because an upstream increase or decrease in the flow-rate of the controlled gas causes a corresponding increase or decrease in the pressure in cavity 22. This in turn causes valve 85 to open or close, thereby increasing or decreasing the flow-rate of the controlled gas through valve 85, which brings the pressure in cavity 22 back to its original value.

As can be seen from FIGS. 1, 2, and 3, the plug 1 and spacer 2 are preferably built so that faces 41 and 42 of plug 1 have different areas. In the embodiment shown in these figures, the area of face 41 is smaller than the area of face 42. This enables the improved differential pressure regulator of this invention to control the pressure of a low pressure gas with a high pressure gas. This is very desirable in certain applications and in particular in a water electrolysis process, as previously referred to, where the oxygen pressure must be maintained at a constant amount below the hydrogen pressure.

Moreover, by the use of a plug having faces with different areas, not only is it possible to control a low pressure gas with a high pressure gas, but is is also possible to selectively control the pressure differential provided by the regulator. This is so because the force provided by each diaphragm is a function of the area of the adjacent face of the plug 1 as well as the pressure against that diaphragm. Thus the area of a first face of plug 1 can be increased or decreased with respect to the area of the second face without changing the ultimate force provided by the first diaphragm, so long as the pressure against that diaphragm is correspondingly decreased or increased. Thus by changing the ratio of the areas of the plug faces the pressure differential necessary to bring the plug to equilibrium can be varied.

In addition to the above design, the plug 1 and spacer 2 can be made so that the area of face 41 is the same as the area of face 42. In this situation, the regulator can maintain the pressure of a controlled gas stream to substantially the same pressure as the reference gas. Moreover, by appropriate selection of spring 15 in this situation, the regulator is capable of providing a relatively constant pressure differential between a high pressure reference gas and a low pressure controlled gas.

In particular, if the areas of faces 41 and 42 are the same, the improved differential pressure regulator of this invention can maintain a relatively constant pressure differential regardless of the pressure of operation. This is so because the net force acting on plug 1 from the two gases is the product of the common area of the plug faces and the net pressure difference between the reference gas and the controlled gas.

This relationship, however, does not hold true for the improved pressure differential regulator when the areas of faces 41 and 42 are different. In this situation, the pressure differential provided by the regulator does not vary directly with a change in operating pressures. This is so because as the pressures of the system increase, the force provided by the diaphragm adjacent the larger face of plug 1 increases at a faster rate than the force provided by the other diaphragm. The reason for this is that the force provided by each diaphragm on plug 1 is a function of not only the pressure against the diaphragm but also the area of the diaphragm.

A unique advantage of the improved differential pressure regulator of this invention is that even though it employs a plug whose faces have different areas, and is thus able to control a low pressure gas by a high pressure gas, it is still able to provide a relatively constant pressure differential between the high pressure reference gas and the low pressure controlled gas over a relatively broad range of operating pressures. This unique advantage is inherent in the design of the improved differential pressure regulator of this invention and is particularly due to the spring 15 shown in FIGS. 1 and 4. By the use of this spring, it is possible to provide a relatively constant pressure differential from an operating pressure of as low as zero psig. to any operating pressure desired. This is particularly useful in the water electrolysis process referred to above, where a relatively constant pressure differential must be maintained between the high pressure hydrogen stream and the low pressure oxygen stream from the moment the reaction begins at zero psig. to the final operating pressure.

Starting from an initial pressure of zero psig. in both streams to the ultimate operating pressure, the improved differential regulator of the invention provides a relatively constant pressure differential in the following manner. At start up, spring 15 biases needle 13 in its uppermost position, since at zero reference gas pressure there is no force exerted on plug 1 by diaphragm 3. As gas begins to flow into pressure inlet tube 5 in bonnet 11, pressure in cavity 95 increases, thereby causing diaphragm 3 to exert a force on plug 1. However, since spring 15 is pushing against needle 13, causing diaphragm 4 to push against plug 1, the increase in pressure in cavity 95 is not sufficient to close valve 85 until the force provided by diaphragm 3 against face 41 slightly exceeds the force provided by spring 15. Thus, until the pressure in cavity 95 builds to a predetermined value, which as can be seen depends on spring 15, valve 85 remains open and the controlled gas continues to flow through base 10. Of course, as soon as valve 85 closes, the increase in pressure of the controlled gas in cavity 22 acts on diaphragm 4 to force the valve 85 slightly open. In effect, valve 85 comes to equilibrium so that the force provided by diaphragm 3 is equal and opposite to the sum of the force provided by spring 15 and the force provided by diaphragm 4.

As the pressures in the system approach the predetermined operating pressures the relative effect of spring 15 becomes less and less compared to the forces provided by diaphragms 3 and 4. This is so because the force provided by the spring 15 is constant, while the forces provided by the diaphragms 3 and 4 vary directly with the pressures in cavities 95 and 22 respectively.

Moreover, as the pressures of the system increase, the pressure differential provided between the reference gas and the controlled gas increases. This is so because the faces 41 and 42 in plug 1 have different areas. As a result, an increase in pressure in cavity 95 requires a correspondingly smaller increase in pressure in cavity 22 to keep the plug 1 in equilibrium, since the opposing forces provided by diaphragms 3 and 4 are functions not only of the pressures of the cavities 95 and 22 but also of the areas of faces 41 and 42. Furthermore, this effect becomes more pronounced when the ratio of the areas of faces 41 and 42 increases.

Thus as can be seen, the pressure differentials provided by the regulator anywhere between zero pressure and the ultimate operating pressures are a function of the size of spring 15 and the areas of plug faces 41 and 42. Moreover, the rate at which the pressure differential increases with increasing pressure is a function of the ratio of the areas of the plug faces. Thus, by appropriate selection of these parameters, an improved differential pressure regulator having the desired operating characteristics can be made.

In order to select the proper plug face sizes and spring size for a known ultimate operating reference gas pressure, a desired ultimate pressure differential and a desired initial pressure differential, the following steps can be followed: First, the area of face 41 is selected. Next, since the initial pressure drop, and hence the initial pressure in cavity 95 when valve 85 first closes is known, the force exerted by diaphragm 3 on plug 1 can be calculated. In particular, at the instant valve 85 closes, this force is approximately equal to the force provided by spring 15. Thus spring 15 can be chosen accordingly. It is preferable to select spring 15 so that its force remains relatively constant from its maximum extended position to its maximum contracted position in the regulator.

The area of face 42 cannot be directly calculated, since the position of needle 13 and hence the force exerted by spring 15 are not known when the regulator is operating at its ultimate operating pressure. Rather the area of face 42 can be obtained by trial and error. A very good guide can be made, however, by assuming the spring force at the ultimate operating conditions is the same as the spring force of the spring when it is fully compacted. Since spring 15 has been selected so that its force remains relatively constant regardless of its displacement, this assumption is relatively accurate. The area of force 42 can then be calculated by assuming that the plug 1 is in equilibrium.

In another preferred embodiment, bonnet 11 can be provided with a spring and means to vary the compressive force of this spring. The spring is positioned inside cavity 95 so that it exerts a force biasing diaphragm 3 against plug 1. This spring provides a force which is exactly opposite to the force provided by spring 15. Thus, because the spring in chamber 95 is variable, the ultimate force provided by the two springs, and hence the ultimate effect provided by spring 15 can be easily controlled. This enables the response of the regulator to be finely tuned to provide the exact operating characteristics desired.

While the above invention has been specifically described with reference to controlling a low pressure gas by reference to a high pressure gas, the regulator can be used in any application where differential pressure regulators of the prior art have been used.

I claim:

1. A differential pressure regulator for maintaining the pressure of a controlled gas upstream of the regulator a predetermined and constant amount above the pressure of a reference gas, said regulator comprising: a first continuous diaphragm; a chamber adjacent said first diaphragm and formed on one side by said first diaphragm, said chamber including means for receiving said reference gas; a second continuous diaphragm generally parallel to and spaced from said first diaphragm a predetermined distance; plug means intermediate said first and second diaphragms, said plug means having a first substantially flat face in contact with said first diaphragm and a second substantially flat face in contact with said second diaphragm, the width of said plug means between said first and second faces being substantially the same as said predetermined distance; a valve in contact with said second diaphragm, said valve adapted to open and close in response to movement of said second diaphragm; a second chamber adjacent said second diaphragm and formed in part by said second diaphragm, said second chamber being adapted to receive said controlled gas; biasing means in said second chamber for exerting a force on said plug means tending to move said plug means towards said first chamber thereby opening said valve means; inlet means for passing controlled gas into said second chamber; and exit means for passing controlled gas through said valve means and out of said second chamber; said apparatus further characterized in that the cross sectional area of said first face is smaller than the cross sectional area of said second face.

2. Apparatus according to claim 1 wherein said biasing means is adapted to exert a substantially constant force from its maximum extended operating position to its minimum contracted operating position.

3. Apparatus according to claim 1 further including spacer means intermediate said first and second diaphragm, said spacer means having an aperture therein for receiving said plug means, said aperture having a smaller cross sectional area on the side of said spacer means facing said first diaphragm than on the side of said spacer means facing said second diaphragm.

4. Apparatus according to claim 3 wherein the cross sectional area of the side of the plug facing said first diaphragm is smaller than the cross sectional area of the aperture in said spacer means facing said first diaphragm and further wherein the cross sectional area of the side of said plug facing said second diaphragm is smaller than the cross sectional area of the side of said spacer means facing said second diaphragm.

5. Apparatus according to claim 4 wherein the cross sectional area of said plug means in an area intermediate its faces is substantially the same as the cross sectional area of the aperture on the side of said spacer means facing said second diaphragm.

6. Apparatus according to claim 1 wherein said valve comprises a circular aperture through which controlled gas is adapted to flow, a needle having tapered sides adapted to move into and away from said circular aperture, and an O-ring having a diameter substantially the same as the diameter of said circular aperture, said O-ring coaxially mounted on said circular aperture.

7. Apparatus according to claim 6 wherein said biasing means acts on said needle.

8. Apparatus according to claim 7 wherein said biasing means is a spring.

9. Apparatus according to claim 1 wherein said biasing means is a spring.

* * * * *